May 2, 1933.    S. N. SMITH ET AL    1,906,826
PIPE COUPLING
Filed July 12, 1930
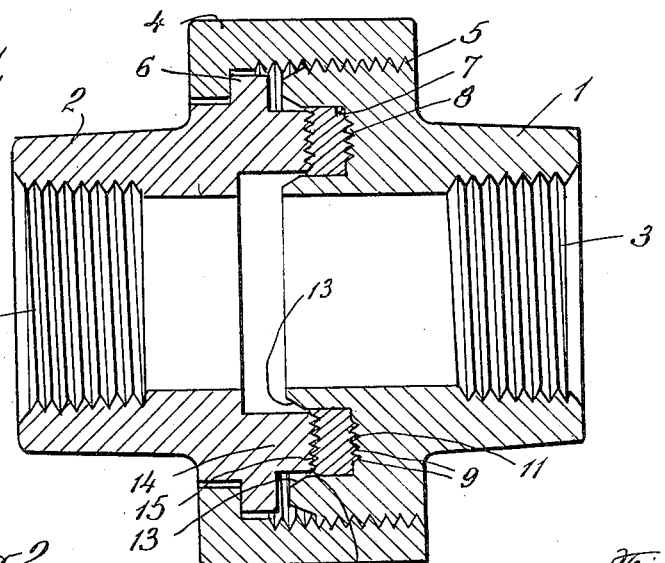
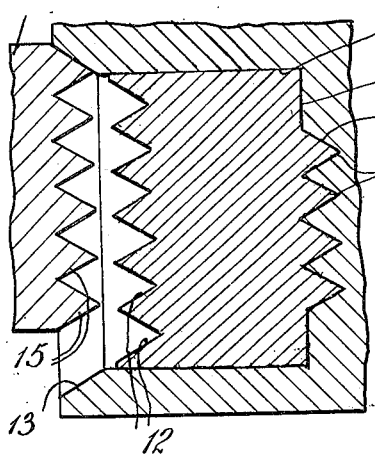
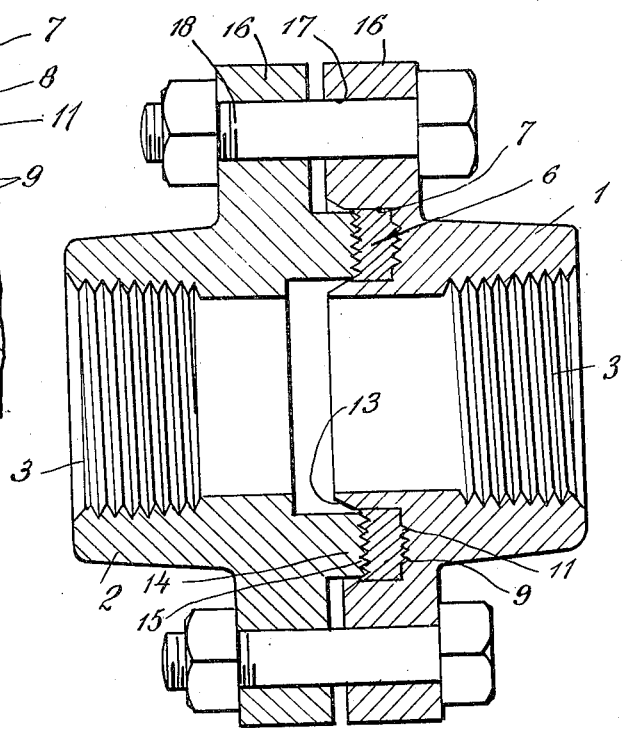
INVENTORS
Samuel N. Smith +
James F. Bennie
BY
Pennie, Davis, Marvin & Edmonds
ATTORNEYS Patented May 2, 1933

1,906,826

UNITED STATES PATENT OFFICE

SAMUEL N. SMITH AND JAMES F. BEMIES, OF NEW YORK, N. Y., ASSIGNORS, BY MESNE ASSIGNMENTS, TO UNITED SUPERIOR UNION COMPANY, INC., A CORPORATION OF NEW YORK

PIPE COUPLING

Application filed July 12, 1930. Serial No. 467,416.

This invention relates to improvements in pipe couplings. A pipe coupling comprises essentially three members—two mating members, frequently referred to as sockets, designed to be mounted on the ends of the pipe sections to be coupled, and means for drawing these union members or sockets together. For small pipe this means is commonly in the form of a coupling nut rotatably mounted on one of the sockets, which is provided with a cooperating flange, and making threaded engagement with the other socket. For larger pipe each socket is provided with a flange and the coupling effected by means of peripherally spaced bolts passing through these flanges.

In addition to these three elements a gasket or packing ring is sometimes employed. Where pressures and temperatures are low and the fluid passing through the pipe is non-corrosive, gaskets of rubber or leather or similar materials may be employed. For more exacting uses gaskets of soft metal, such as lead, have been suggested, but these, although generally superior to rubber and leather, are unsatisfactory at pressures above 150 to 200 pounds per square inch, and at temperatures above 300° F. they soften and so cannot be used. Therefore, many pipe couplings used under conditions of high temperature and pressure rely on a metal-to-metal contact, without a gasket, but with the cooperation and registering of a spherical or convex surface with one that is concave. If sufficient pressure is exerted and if the abutting faces are ground with sufficient care, a fairly satisfactory connection can be made by this means the first time the coupling is used. The principal objection to this type of coupling is that when the connection, once made, is broken, it is extremely difficult to remake it with the same effectiveness.

It is the object of the present invention to provide a pipe coupling capable of withstanding temperatures from 300 to 750° F. and pressures from 350 to 450 pounds per square inch, and with which the connection can be made and remade without loss of efficiency. We have attained this object by making the abutting faces of the mating members of relatively hard metal having slightly different yield points and providing each with concentric serrations wedge-shaped in cross section designed to cooperate with corresponding serrations in the abutting face of the other mating member, each cooperating ridge and groove constituting, in effect, a conical valve and seat, the plurality of them setting up a very effective barrier to the passage of fluid. The more yielding metal is preferably in the form of a gasket permanently secured in one of the sockets. We are aware of the fact that serrated coupling faces have been used for the purpose of biting into an interposed gasket that is extremely soft and of low melting point, to form their own seats, but such seats are usually unsatisfactory with the high pressures and temperatures now prevailing.

One of the important features of our invention is the provision of means insuring accurate seating and reseating of the parts when the coupling is assembled and reassembled. To this end we place one of the abutting serrated faces, preferably the more yielding, within a recess or channel having flaring side walls, the other mating member being provided with an annular rib or flange having a serrated face. The flaring side walls of the channel guide the rib into mating relation with the other member with the proper ridge entering the proper groove even though the pipe sections are not in proper alinement when brought together. Once the proper grooves and ridges are in approximate registry the pressure exerted by the clamping nut seats them perfectly. Where a coupling nut is used generous thread tolerances must be used to facilitate ease of assembly and disassembly, and if these tolerances should work one way on the first seating and another way during subsequent seatings different impressions would be made in the softer metal and spaces would be left between the ridges and one side of the grooves unless a guiding channel is provided to lead the ridges into the grooves. For high pressure work this imperfect seating would be very unsatisfactory. One of the metals of our coupling is sufficiently softer than the other to yield slightly under pressure thus compensating for slight inaccuracies in the coupling members and forming a fluid-tight joint every time the connection is made, but neither is so soft as to make accurate reseating impossible. When a gasket is used it is permanently secured in the channel and provided on its lower face with serrations interfitting with corresponding serrations in the bottom of the channel.

In order that our invention may be more clearly understood we have illustrated certain preferred embodiments in the accompanying drawing which we shall now describe. In the drawing, Figure 1 is a longitudinal section through a coupling of the coupling-nut type constructed in accordance with the present invention; Figure 2 is a section on an enlarged scale showing in detail the relations between the gasket, the channel and the rib when the parts are approaching operative position, the flaring side walls of the channel leading the rib to its proper seat, and Figure 3 is a section similar to Figure 1 showing the invention applied to a union of the flange type.

The coupling illustrated in Figure 1 comprises union members or sockets 1 and 2 internally threaded at 3 for receiving the ends of the pipe sections to be coupled, and a coupling-nut 4 rotatively mounted on the socket 2 and internally threaded at 5 for engagement with corresponding threads on the socket 1. Socket 2 is provided with an annular flange or shoulder 6 against which the coupling 4 abuts in drawing the sockets into coupling relation.

The outer face of the socket 1 is provided with an annular channel 7 which receives and holds the gasket 8. The bottom of this channel is provided with a plurality of concentric annular grooves 9 substantially V-shaped in cross-section and the gasket 8, which is mounted within the channel, is provided on its lower face with an equal number of concentric annular ridges 11, likewise substantially V-shaped in cross-section which enter the grooves 9 when the gasket is placed within the channel. The socket members are usually made of malleable iron but may be made of steel forgings or other suitable material, while the gasket is made of a metal with a slightly less yield point.

We have used with satisfactory results metal consisting of 50% copper and 50% lead, but bronze or other metals having a yield point slightly less than the metal of the mating member might also be used. By using a relatively hard metal having a yield point just sufficiently lower than that of the other mating member we attain a tight leak-proof union each time the parts are assembled.

In manufacturing the coupling the grooves 9 are machined in the bottom of the channel, the corresponding ridges 11 machined on the bottom of the gasket and the gasket placed in relation to the channel with its ridges 11 innermost and opposed to the grooves 9. The socket and gasket are then placed within a press and the gasket subjected to longitudinal pressure to force the gasket to the bottom of the channel and into permanent holding engagement with the lateral sides of the channel, for example by the pressure of an expanding and forming die which expands it to anchor it firmly in position within the channel. The described method of manufacture is more fully described in companion Patent No. 1,880,115, granted September 25, 1932 on an application filed simultaneously herewith, although the described steps are subject to many modifications. The tight anchoring of the ring or gasket in the channel may be termed press-fitting it in place, intended to include expansion or other anchoring action under pressure during manufacture. The ridges 11 are thus, during manufacture forced into intimate contact with the grooves 9, the metal of the gasket flowing slightly to conform exactly to the configuration of the grooves and thus make a fluid-tight seal with the socket member. The outer face of the gasket is provided with a plurality of concentric annular grooves 12 of the same form as the grooves 9 in the bottom of the channel. These grooves are preferably formed by the expanding and forming die but may be otherwise formed. The side walls of the channel are parallel for their major extent, but taper outwardly at 13 above the gasket for the purpose of guiding the rib into seating position.

The face of socket 2 is provided with an annular rib or flange 14 slightly narrower than the channel 7 and adapted to enter that channel when the sockets are in abutting relation, as illustrated in Figure 1. The outer face of this rib 14 is provided with a plurality of concentric ridges 15 V-shaped in cross section and adapted to enter the similarly shaped grooves 12 in the upper face of the gasket.

In using the coupling just described the sockets are first mounted on the ends of the pipe sections to be coupled and the two brought into substantial alinement. In practice the two sections are usually not in perfect alinement and the abutting faces of the sockets are not always parallel. In order, therefore, to insure a perfect seating of the rib 14 within the channel 7 we have provided the latter with flaring side walls 13 which receive the rib and guide it into the channel as illustrated in Figure 2. The angle of the flare is such that each annular ridge 15 on the face of the rib is guided into its annular groove 12 in the upper face of the gasket. After the parts are in approximate alinement, the coupling nut 4 is turned on threads 5 and the coupling completed. The pressure exerted by the coupling nut causes the ridges 15 to seat themselves firmly within the grooves 12, the metal of the gasket being sufficiently softer than the metal of the rib to flow slightly under the pressure and thus make a tight and practically leak-proof union. The metal of the gasket is, however, sufficiently hard and resistant to make it impossible for the ridges on the rib to deform the grooves, as would be the case were soft metal, like lead, employed.

The coupling of Figure 3 is substantially identical with that of Figure 2 but shows the invention applied to a coupling of the flange type each socket being provided with a flange 16 provided with spaced peripheral holes 17 through which bolts 18 are passed to hold the sockets in coupling relation.

The coupling of the present invention is capable of use on lines passing superheated steam, hot oils and other fluids which inevitably leak past other couplings.

We claim:

1. As an article of manufacture, a plumber's union or pipe coupling of the kind having the opposed union members of a very hard metal, as iron, one of said members having an annular channel with preformed concentric ridges and grooves in the bottom thereof, a packing ring of relatively softer metal, but of a character capable of withstanding high temperatures, press-fitted into the annular channel and being provided with preformed concentric ridges and grooves adapted to form a fluid tight seal with the corresponding grooves and ridges in the annular channel, the other of said union members having an annular projection engageable with the outer face of the annular packing ring and being likewise provided with concentric ridges and grooves adapted to seat in and form a fluid tight seal with corresponding preformed grooves and ridges in the outer face of the packing ring, when the union members are drawn together.

2. As an article of manufacture, a plumber's union or pipe coupling of the kind having the opposed union members of a very hard metal, as iron, one of said members having an annular channel with preformed concentric ridges and grooves in the bottom thereof, a packing ring of relatively softer metal, but of a character capable of withstanding high temperatures, press-fitted into the annular channel but not filling its depth and being provided with preformed concentric ridges and grooves adapted to form a fluid tight seal with the corresponding grooves and ridges in the annular channel, the other of said union members having an annular flange receivable in the unfilled depth of the annular channel of the first member and being likewise provided with concentric ridges and grooves adapted to seat in and form a fluid tight seal with corresponding preformed grooves and ridges in the outer face of the packing ring when the union members are drawn together; the outer portion of the annular channel in the first union member being flared so as to guide the annular flange of the second union member into proper seating relation with the preformed grooves and ridges of the packing ring, when the union members are drawn together in use.

In testimony whereof we affix our signatures.

SAMUEL N. SMITH.
JAMES F. BEMIES.